United States Patent
Yamano

(10) Patent No.: US 11,557,778 B2
(45) Date of Patent: Jan. 17, 2023

(54) FUEL BATTERY SYSTEM

(71) Applicant: HONDA MOTOR CO., LTD., Tokyo (JP)

(72) Inventor: Naoki Yamano, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 41 days.

(21) Appl. No.: 17/355,373

(22) Filed: Jun. 23, 2021

(65) Prior Publication Data

US 2021/0408566 A1 Dec. 30, 2021

(30) Foreign Application Priority Data

Jun. 30, 2020 (JP) .............................. JP2020-113284

(51) Int. Cl.
*H01M 8/04* (2016.01)
*H01M 8/04746* (2016.01)
*H01M 8/04082* (2016.01)

(52) U.S. Cl.
CPC ... *H01M 8/04753* (2013.01); *H01M 8/04201* (2013.01); *H01M 2250/20* (2013.01)

(58) Field of Classification Search
CPC ......... H01M 8/04753; H01M 8/04201; H01M 2250/20
USPC .......................................................... 429/443
See application file for complete search history.

(56) References Cited

U.S. PATENT DOCUMENTS

| | | | |
|---|---|---|---|
| 2020/0091525 A1* | 3/2020 | Fujita | H01M 8/04776 |
| 2020/0091529 A1* | 3/2020 | Yamanishi | H01M 8/04753 |
| 2020/0119378 A1* | 4/2020 | Min | H01M 8/04231 |
| 2020/0280080 A1* | 9/2020 | Yokoyama | H01M 8/04753 |

FOREIGN PATENT DOCUMENTS

JP 2016-054604 4/2016

* cited by examiner

*Primary Examiner* — James M Erwin
(74) *Attorney, Agent, or Firm* — Amin, Turocy & Watson, LLP

(57) ABSTRACT

A fuel battery system includes: a plurality of fuel tanks configured to store fuel; a fuel battery stack configured to generate electricity using the fuel supplied from each of the plurality of fuel tanks; a filling unit configured to fill each of the plurality of fuel tanks with the fuel; and a control device configured to control the fuel battery stack to maintain generating of electricity by continuously supplying fuel from at least any one of the plurality of fuel tanks other than the fuel tank filled with the fuel from the filling unit to the fuel battery stack when at least one of the plurality of fuel tanks is filled with the fuel from the filling unit.

4 Claims, 4 Drawing Sheets

FUEL BATTERY SYSTEM

CROSS-REFERENCE TO RELATED APPLICATION

Priority is claimed on Japanese Patent Application No. 2020-113284, filed Jun. 30, 2020, the content of which is incorporated herein by reference.

BACKGROUND OF THE INVENTION

Field of the Invention

The present invention relates to a fuel battery system.

Description of Related Art

In the related art, for example, large vehicles such as buses having a plurality of fuel battery devices installed therein as power sources and configured to supply electricity from the plurality of fuel battery devices to external power suppliers are known (for example, refer to Japanese Unexamined Patent Application, First Publication No. 2016-54604).

SUMMARY OF THE INVENTION

In the vehicles described above, when the amount of fuel in a fuel tank becomes reduced while electricity is being supplied to an external power supplier, it will be necessary to fill the fuel tank with fuel to continuously supply electricity. However, if the supply of fuel from the fuel tank to the fuel battery stack stops when the fuel tank is filled with fuel, there is a problem that electricity cannot be continuously generated and the supply of electricity to the external power supplier stops.

An aspect according to the present invention was made in consideration of such circumstances, and an object of the present invention is to provide a fuel battery system capable of continuing power generation when a fuel tank is filled with fuel again.

In order to solve the above problems and achieve the above object, the present invention has adopted the following aspects.

(1) A fuel battery system according to an aspect of the present invention includes: a plurality of fuel tanks configured to store fuel; a fuel battery stack configured to generate electricity using the fuel supplied from each of the plurality of fuel tanks; a filling unit configured to fill each of the plurality of fuel tanks with fuel; and a control device configured to control the fuel battery stack such that generation of electricity is maintained by continuously supplying fuel from at least any one of the plurality of fuel tanks other than the fuel tank being filled with fuel from the filling unit to the fuel battery stack when at least one of the plurality of fuel tanks is being filled with fuel from the filling unit.

(2) In the above aspect (1), the fuel battery system may include: a first valve mechanism configured to switch a filling state of the fuel between the filling unit and each of the plurality of fuel tanks under the control of the control device; and a second valve mechanism configured to switch whether the fuel is supplied between each of the plurality of fuel tanks and the fuel battery stack under the control of the control device.

(3) In the above aspect (1), the fuel battery system may include: a pipe configured to connect any combination of the plurality of fuel tanks. The control device may perform control so that the fuel tank being filled with the fuel from the filling unit is connected to the fuel tank configured to supply fuel to the fuel battery stack via the pipe and the fuel is allowed to circulate using the pipe at the time of performing filling and supplying of the fuel.

(4) In any one of the above aspects (1) to (3), the fuel battery system may include: a power supply unit configured to supply electricity to the outside. The control device may perform control so that electricity is supplied using the power supply unit at the time of performing filling and supplying of the fuel.

According to the above aspect (1), it is possible to continuously generate electricity when a fuel tank is being filled with fuel by providing a control device which performs control so that fuel is continuously supplied from another fuel tank to a fuel battery stack when a fuel tank is being filled with fuel. Thus, it is possible to fill a fuel tank with fuel without stopping the supply of electricity to the outside and it is possible to improve the convenience.

In the case of the above aspect (2), it is possible to easily control the filling and the supply of fuel by providing the first valve mechanism configured to adjust the filling of the fuel and a second valve mechanism configured to adjust the supply of the fuel.

In the case of the above aspect (3), it is possible to continuously circulate fuel from the filling unit to the fuel battery stack via the fuel tank at the time of performing filling and supplying of the fuel by providing a pipe configured to connect the fuel tank filled with fuel and the fuel tank configured to supply fuel.

In the case of the above aspect (4), it is possible to fill the fuel tank with fuel without stopping the supply of electricity to the outside and it is possible to improve the convenience by providing the power supply unit configured to supply electricity to the outside at the time of performing filling and supplying of the fuel.

DETAILED DESCRIPTION OF THE INVENTION

A vehicle 1 including a fuel battery system 10 according to an embodiment of the present invention will be described below with reference to the accompanying drawings.

Figure 1:
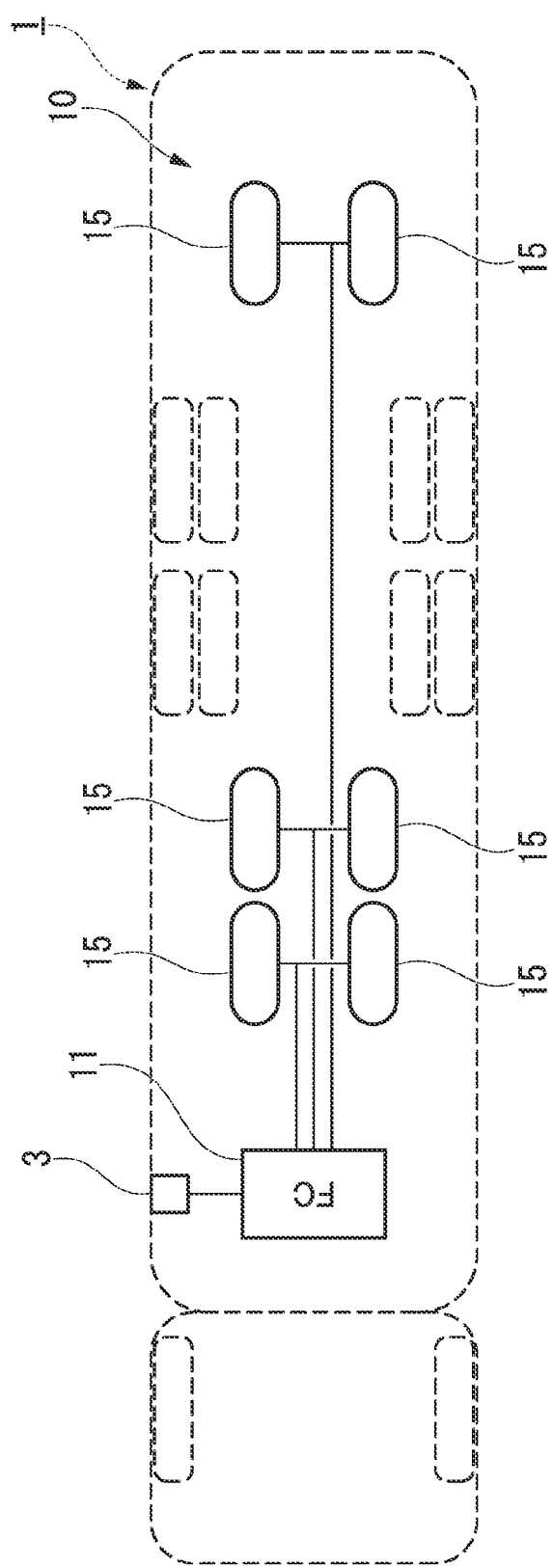
FIG. 1 is a schematic diagram illustrating a constitution of a vehicle having a fuel battery system installed therein in an embodiment of the present invention.
Figure 2:
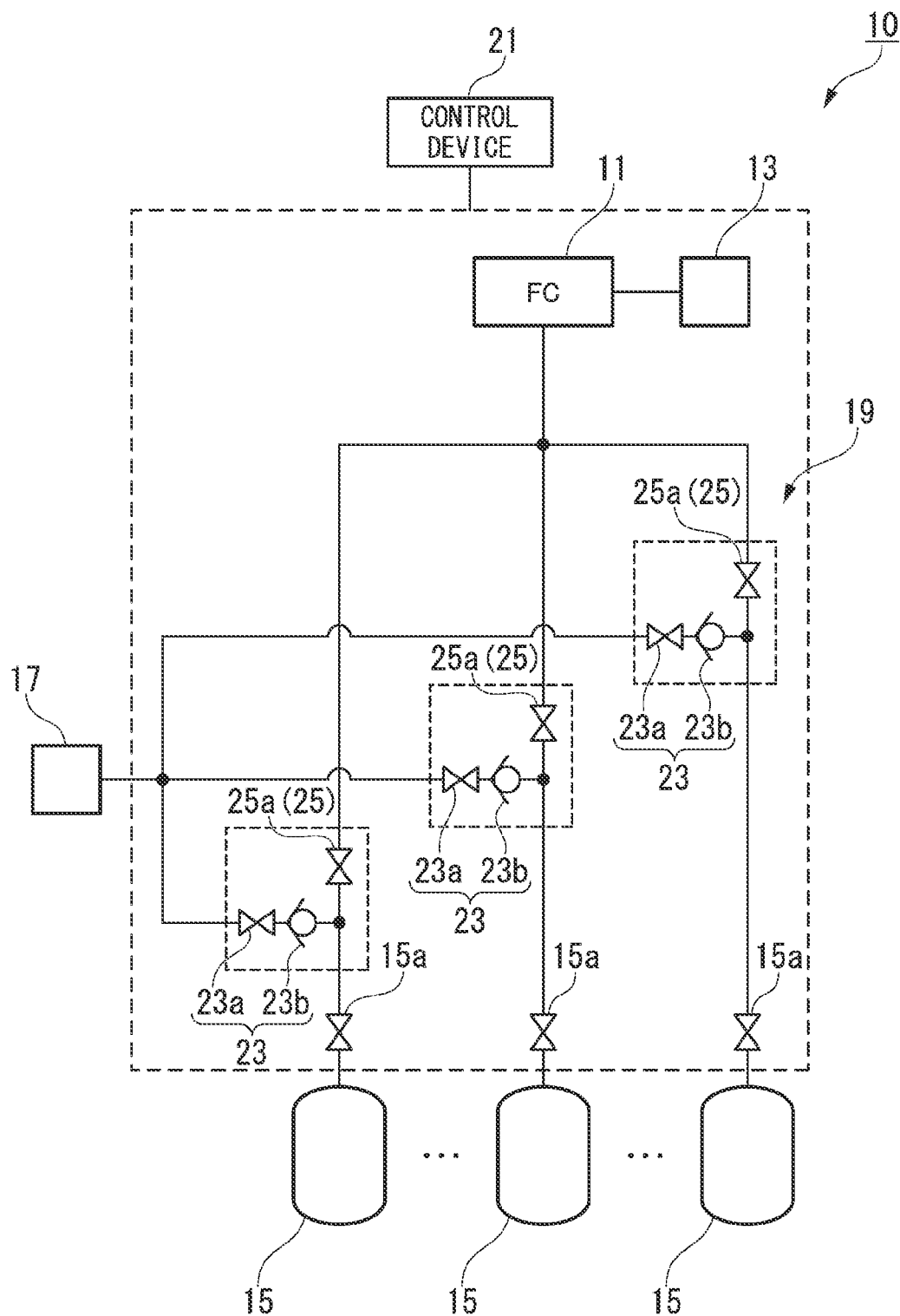
FIG. 2 is a diagram illustrating a constitution of the fuel battery system in the embodiment of the present invention.

FIG. 1 is a schematic diagram illustrating a constitution of the vehicle 1 having the fuel battery system 10 in the embodiment. FIG. 2 is a diagram illustrating a constitution of the fuel battery system 10 in the embodiment.

The fuel battery system 10 in the embodiment is installed, for example, in a large vehicle 1 such as a truck and a bus. The vehicle 1 includes, for example, a power supply such as the fuel battery system 10 and a power storage device and a power supply unit 3 connected to the power supply. For example, the power supply unit 3 in which a power supply port having a power supply terminal or the like disposed therein is formed supplies electric power from the power supply of the vehicle 1 to an external load.

The fuel battery system 10 includes a fuel battery stack 11, an air pump 13, a plurality of fuel tanks 15, a fuel filling unit 17, a valve mechanism 19, and a control device 21. The control device 21 is connected to constituent components of the fuel battery system 10 using signal lines.

The fuel battery stack (FC) 11 is, for example, a polymer electrolyte fuel battery. For example, the polymer electrolyte fuel battery includes a plurality of laminated fuel battery cells and a pair of end plates having a laminate body formed of the plurality of fuel battery cells arranged therebetween. Each of the fuel battery cells includes an electrolyte electrode structure and a pair of separators having the electrolyte electrode structure arranged therebetween. The electrolyte electrode structure includes the solid polymer electrolyte membrane and a fuel electrode and an oxygen electrode having the solid polymer electrolyte membrane arranged therebetween. The solid polymer electrolyte membrane includes a cation exchange membrane and the like. The fuel electrode (an anode) includes an anode catalyst, a gas diffusion layer, and the like. The oxygen electrode (a cathode) includes a cathode catalyst, a gas diffusion layer, and the like.

The fuel battery stack 11 generates electricity using a catalytic reaction between a fuel gas supplied from the plurality of fuel tanks 15 to the anode and an oxidizing agent gas such as oxygen-containing air supplied from the air pump 13 to the cathode.

The plurality of fuel tanks 15 are connected to the fuel battery stack 11 and the fuel filling unit 17 via the valve mechanism 19. The plurality of fuel tanks 15 store fuel to be filled from the fuel filling unit 17. The fuel is, for example, hydrogen. Each of the plurality of fuel tanks 15 supplies the fuel to the fuel battery stack 11.

The fuel filling unit 17 includes, for example, a receptacle or the like to which a filling nozzle of an external mobile or fixed fuel filling device is connected. The fuel filling unit 17 having a filling port configured to receive fuel supplied from the external fuel filling device is connected to each of the plurality of fuel tanks 15 via the valve mechanism 19.

The valve mechanism 19 includes, for example, a first valve mechanism 23 for filling and a second valve mechanism 25 for supplying for each of the plurality of fuel tanks 15.

The first valve mechanism 23 for filling includes, for example, a first control valve 23a configured to switch a filling state, a pressure, and the like of fuel under the control of the control device 21 between the fuel filling unit 17 and an opening/closing valve 15a of the fuel tanks 15, and a check valve 23b configured to prohibit the circulation of fuel from the fuel tanks 15 side toward the fuel filling unit 17 side, and the like.

The second valve mechanism 25 for supplying includes, for example, a second control valve 25a or the like configured to switch the presence/absence of fuel, a pressure, and the like between the opening/closing valve 15a of the fuel tanks 15 and the fuel battery stack 11 under the control of the control device 21.

The control device 21 integrally controls, for example, an operation of the fuel battery system 10.

The control device 21 is, for example, a software function unit configured to function through a prescribed program executed using a process such as a central processing unit (CPU). The software function unit is an electron control unit (ECU) including a processor such as a CPU, a read only memory (ROM) having a program stored therein, a random access memory (RAM) having data temporarily stored therein, and an electronic circuit such as a timer. At least a part of the control device 21 may be an integrated circuit such as a large scale integration (LSI).

The control device 21 sets, for example, a combination of the fuel tanks 15 for filling and the fuel tanks 15 for supplying from among the plurality of fuel tanks 15 on the basis of the remaining amount of fuel of each of the fuel tanks 15. The control device 21 makes the first valve mechanism 23 for the fuel tanks 15 for filling have an open state and the second valve mechanism 25 for the fuel tanks 15 for filling have a closed state and makes the first valve mechanism 23 for the fuel tanks 15 for supplying have a closed state and the second valve mechanism 25 for the fuel tanks 15 for supplying have an open state. The control device 21 controls the fuel battery stack 11 to maintain generating of electricity by continuously supplying fuel from the fuel tank 15 for supplying of the plurality of fuel tanks 15 other than the fuel tank 15 for filling to the fuel battery stack 11 when the fuel tank 15 for filling is filled with fuel from the fuel filling unit 17. The control device 21 continues filling and supplying fuel at the same time, for example, when electric power is supplied from the power supply unit 3 to the external load.

As described above, when the fuel battery system 10 in the embodiment includes the control device 21 configured to continuously supply fuel from another fuel tank 15 for supplying to the fuel battery stack 11 when the fuel tank 15 for filling is filled with fuel, it is possible to continuously perform the power generation of the fuel battery stack 11 when the fuel tank is filled with fuel. Thus, it is possible to fill the fuel tank 15 with fuel without stopping the supply of electricity to the outside and it is possible to improve the convenience.

It is possible to easily control the filling and the supply of fuel using the control device 21 by providing the first valve mechanism 23 configured to adjust the filling of fuel and the second valve mechanism 25 configured to adjust the supply of fuel.

Modified Examples

Modified examples of the embodiment will be described below. Constituent elements in modified examples that are the same as those of the above-described embodiments will be denoted by the same reference symbols and description thereof will be omitted or simplified.

Although the valve mechanism 19 includes the first control valve 23a of the first valve mechanism 23 for filling for each of the plurality of fuel tanks 15 in the above-described embodiments, the present invention is not limited thereto. In addition, one valve mechanism having a function corresponding to the plurality of first control valves 23a for the plurality of fuel tanks 15 may be provided.

Figure 3:
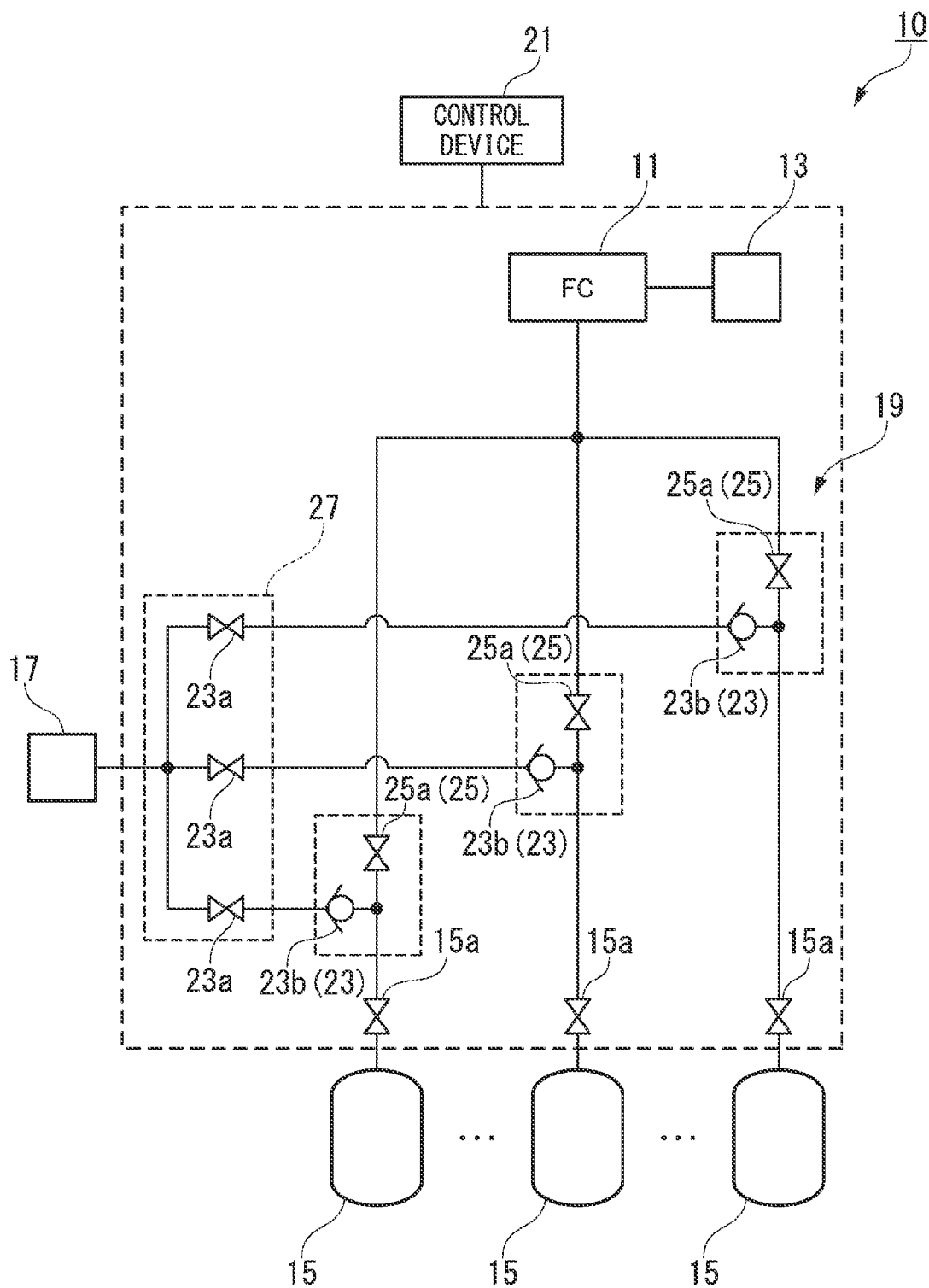
FIG. 3 is a diagram illustrating a constitution of a fuel battery system in a first modified example of the embodiment of the present invention.

FIG. 3 is a diagram illustrating a constitution of a fuel battery system 10 in a first modified example of the embodiment.

The valve mechanism 19 of the fuel battery system 10 in the first modified example includes a third valve mechanism 27 having a function corresponding to a plurality of first control valves 23a. The third valve mechanism 27 may, for example, be a third control valve such as a multi-way valve configured to switch a filling state, a pressure, and the like of fuel for at least any one of the fuel tanks 15 between the fuel filling unit 17 and the opening/closing valve 15a of each of the plurality of fuel tanks 15 under the control of the control device 21.

In the above-described embodiment, the fuel battery system 10 may include a pipe 31 configured to connect any combination of the plurality of fuel tanks 15.

Figure 4:
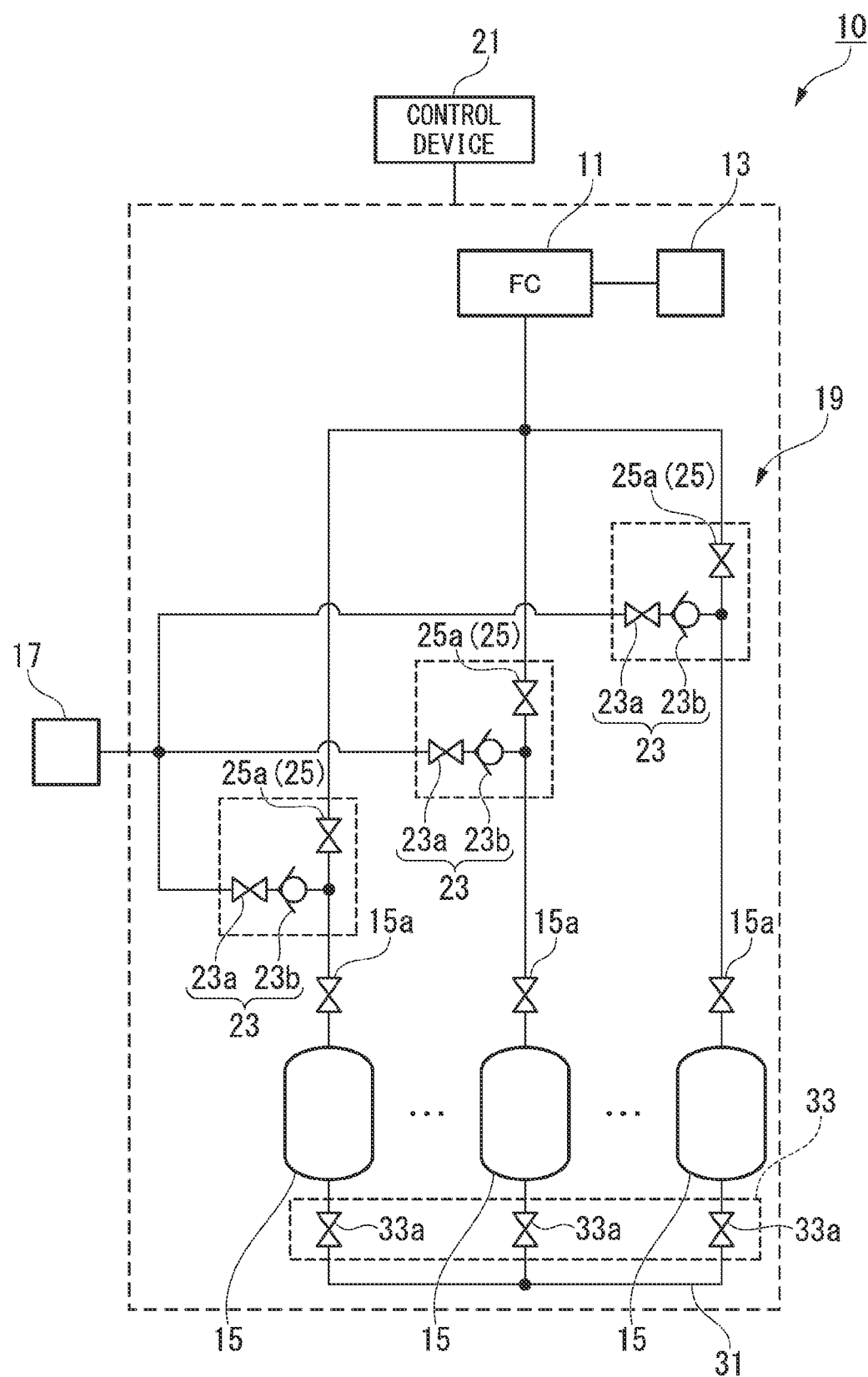
FIG. 4 is a diagram illustrating a constitution of a fuel battery system in a second modified example of the embodiment of the present invention.

FIG. 4 is a diagram illustrating a constitution of a fuel battery system 10 in a second modified example of the embodiment.

The fuel battery system 10 in the second modified example includes, for example, the pipe 31 configured to connect the plurality of fuel tanks 15 and a fourth valve mechanism 33 provided between each of the fuel tanks 15 and the pipe 31. The fourth valve mechanism 33 includes, for example, a fourth control valve 33a configured to control the presence/absence of fuel to circulate, a pressure, and the like for each of the fuel tanks 15 under the control of the control device 21.

In the second modified example, for example, the control device 21 controls the fourth valve mechanism 33 for the fuel tank 15 for filling and the fuel tank 15 for supplying such that it has an open state at the time of performing filling and supplying of fuel. Thus, in a state in which the fuel tanks 15 for filling is filled with fuel from the fuel filling unit 17 and fuel is supplied from the fuel tanks 15 for supplying to the fuel battery stack 11, fuel is allowed to circulate via the pipe 31 between the fuel tanks 15 for filling and the fuel tanks 15 for supplying. For example, the control device 21 continuously supplies fuel from the fuel filling unit 17 to the fuel battery stack 11 via the fuel tanks 15 for filling and the fuel tanks 15 for supplying while adjusting a filling flow rate and a supply flow rate of the fuel using the first valve mechanism 23, the second valve mechanism 25, and the fourth valve mechanism 33.

According to the second modified example, it is possible to continuously circulate fuel from the fuel filling unit 17 to the fuel battery stack 11 via the fuel tanks 15 for filling and supplying at the time of performing filling and supplying of fuel by providing the pipe 31 configured to connect the fuel tank 15 filled with fuel to the fuel tank 15 configured to supply fuel.

Although the control device 21 is configured to supply fuel from the fuel tank 15 for supplying of the plurality of fuel tanks 15 other than the fuel tank 15 for filling to the fuel battery stack 11 at the time of performing filling and supplying of fuel in the above-described embodiment, the present invention is not limited thereto. For example, the control device 21 may control the valve mechanism 19 so that a part of fuel received from the fuel filling unit 17 is directly supplied to the fuel battery stack 11 when the fuel tanks 15 for filling is filled with the fuel. For example, the control device 21 controls the first valve mechanism 23 and the second valve mechanism 25 for the fuel tank 15 for filling to have an open sate and controls a filling amount and a supply amount of fuel.

Although an example in which the fuel battery system is installed in a fuel battery vehicle in which electric power generated in a fuel battery is used as electric power for traveling or electric power for an operation of an in-vehicle apparatus has been described in the above-described embodiment, the system may be installed in an automobile such as two-wheeled, three-wheeled, and four-wheeled automobiles or other mobile bodies (for example, ships, flying objects, and robots) or may be installed in a stationary fuel battery system.

The embodiments of the present invention are presented as examples and are not intended to limit the scope of the present invention. These embodiments can be implemented in various other forms and various omissions, replacements, and modifications are possible without departing from the gist of the present invention. These embodiments and modifications thereof are included in the scope and the gist of the present invention as well as in the scope of the scope of the present invention described in the claims and the equivalent scope thereof.

What is claimed is:

1. A fuel battery system, comprising:
 a plurality of fuel tanks configured to store fuel;
 a fuel battery stack configured to generate electricity using the fuel supplied from each of the plurality of fuel tanks;
 a filling unit configured to fill each of the plurality of fuel tanks with the fuel; and
 a control device configured to control the fuel battery stack to maintain generating of electricity by continuously supplying fuel from at least any one of the plurality of fuel tanks other than the fuel tank filled with the fuel from the filling unit to the fuel battery stack when at least one of the plurality of fuel tanks is filled with the fuel from the filling unit.

2. The fuel battery system according to claim 1, comprising:
 a first valve mechanism configured to switch a filling state of the fuel between the filling unit and each of the plurality of fuel tanks under the control of the control device; and
 a second valve mechanism configured to switch whether the fuel is supplied between each of the plurality of fuel tanks and the fuel battery stack under the control of the control device.

3. The fuel battery system according to claim 1, comprising:
 a pipe configured to connect any combination of the plurality of fuel tanks,
 wherein the control device performs control so that the fuel tank filled with the fuel from the filling unit is connected to the fuel tank configured to supply the fuel to the fuel battery stack via the pipe and the fuel is allowed to circulate using the pipe at the time of performing filling and supplying of the fuel.

4. The fuel battery system according to claim 1, comprising:
 a power supply unit configured to supply electricity to the outside,
 wherein the control device performs control so that electricity is supplied using the power supply unit at the time of performing filling and supplying of the fuel.

* * * * *